United States Patent
Mount et al.

[15] 3,663,932
[45] May 16, 1972

[54] RECONSTRUCTION OF REFLECTING SURFACE VELOCITY AND DISPLACEMENT FROM DOPPLER SIGNALS

[72] Inventors: Bruce Elson Mount, Diamond Bar, Calif.; Harold Lee Massie, Hightstown, N.J.

[73] Assignee: Hoffman-La Roche Inc., Nutley, N.J.

[22] Filed: July 15, 1970

[21] Appl. No.: 54,983

Related U.S. Application Data

[63] Continuation-in-part of Ser. No. 830,681, June 5, 1969, abandoned.

[52] U.S. Cl. .................................. 340/1 R, 340/3 D, 343/9
[51] Int. Cl. .......................................................... G01s 9/66
[58] Field of Search ........................ 340/1 R, 3 D; 343/9, 8; 356/28; 73/194 A

[56] References Cited

UNITED STATES PATENTS 3,525,976   8/1970   Wilcox et al. ........................ 340/1 R Primary Examiner—Richard A. Farley
Attorney—Samuel L. Welt, Jon S. Saxe, Bernard S. Leon and Jacob Frank

[57] ABSTRACT

A method and apparatus for accurate measurement of velocity and displacement of a moving surface by reconstructing the velocity-versus-time and displacement-versus-time functions comprising the steps of detecting the AM and FM or phase information of a Doppler echo signal from the surface to be measured, dividing the FM information by the AM information to obtain the velocity function, and, then, if desirable, performing an integrating step to obtain the relative displacement function.

16 Claims, 4 Drawing Figures

Patented May 16, 1972
3,663,932
2 Sheets-Sheet 1
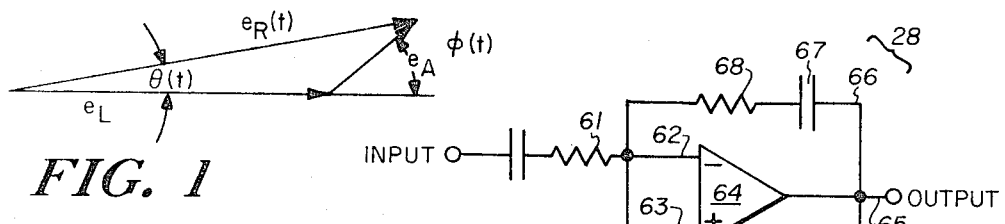
FIG. 1
FIG. 3
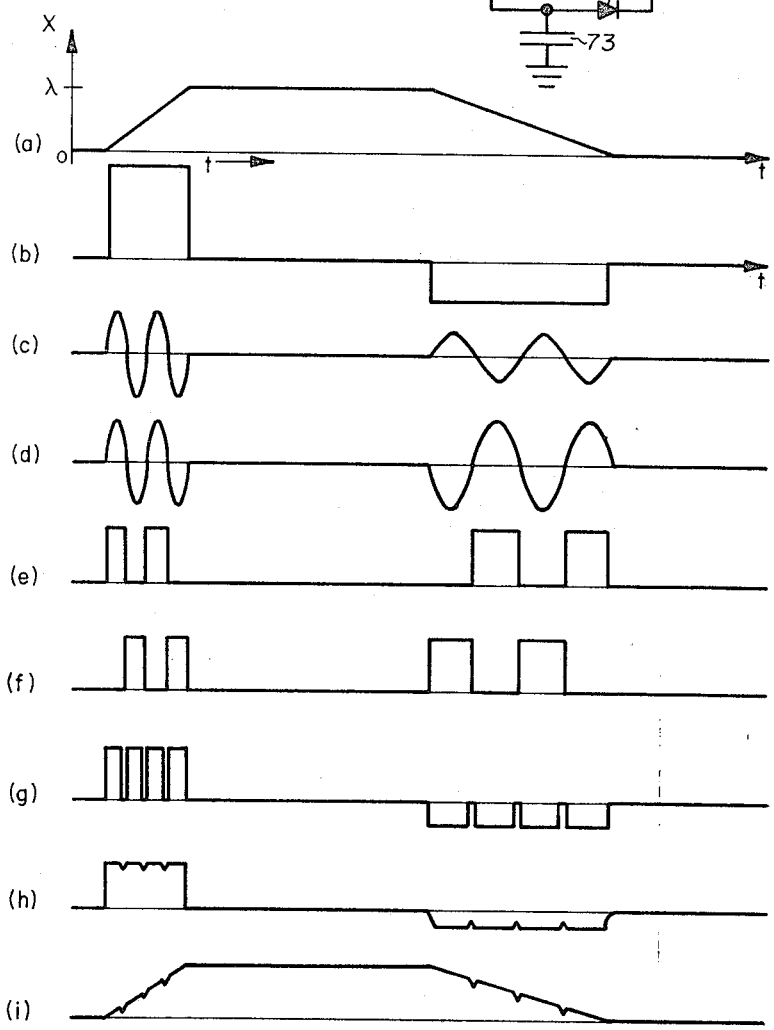
FIG. 4

RECONSTRUCTION OF REFLECTING SURFACE VELOCITY AND DISPLACEMENT FROM DOPPLER SIGNALS

CROSS-REFERENCE TO RELATED APPLICATION

This application is a continuation-in-part of now abandoned application Ser. No. 830,681, filed June 5, 1969, titled Reconstruction of Reflecting Surface Velocity and Displacement From Doppler Signals.

BACKGROUND OF THE INVENTION

1. Field of the Invention

This invention relates broadly to the detection of relative movement between a source and reflecting surface and, more particularly, to a method and system for processing Doppler signals which are generated as a result of the relative movements between these two surfaces.

2. Description of the Prior Art

In the monitoring of surfaces which move relative to one another, various detection techniques employing high radio frequencies (radar), ultrasound, or other energy forms are well known. One of these techniques that is commonly used is the continuous wave Doppler technique which includes evaluation of the modulation product of emitted and reflected energy. When an accurate measure of the surface velocity versus time is desired, the frequency of the Doppler shifted energy is compared to the frequency of the transmitted energy and the difference in frequency is measured, generally by counting cycles or zero-crossings per unit time of the difference frequency. Such methods, however, do not provide an exact function proportional to surface velocity. Further, most known Doppler techniques cannot sense direction because of their incapacity to differentiate between positive and negative frequency shifts. In addition, these methods are only satisfactory in cases when the velocity to be detected is constant for at least the distance equivalent to several cycles of the differential frequency as they are based on the formation of an average value. With respect to the latter, it has been found, however, that in many cases the velocity cannot be regarded as constant over the distance of several wave lengths. In some instances this problem may be easily remedied by operation at higher frequencies, but, often, such operations result in serious difficulties with circuit or transducer design, or too much attenuation of the transmitted energy (e.g., attenuation of ultrasound in the human body) and, therefore, greater resolution of transient motions is desirable.

The purpose of the present invention, is therefore, to provide a method and apparatus for providing a continuous accurate and directional measurement of velocity and displacement of a moving surface relative to a source even for a given small number of cycles of Doppler frequency, by reconstructing as closely as possible the velocity-versus-time and relative displacement-versus-time functions of the surface movement using a continuous wave Doppler technique. This is achieved by processing the received complex waveform, containing the sum of all modulated and non-modulated reflected frequencies, to obtain the FM and AM information, and then performing a division of the FM by the AM information. By simultaneous integration of the velocity function the relative displacement-versus-time function is obtained. A preset band about zero inhibits division by the AM information when near or at zero values.

A further object of the invention is to provide a method and device for employing ultrasonic energy to detect and measure moving surfaces in living organism by reconstruction of surface velocity-versus-time and relative displacement-versus-time waveforms from ultrasonic Doppler signals. Other objects, advantages and capabilities of the present invention will become apparent from the following detailed description, taken in conjunction with the accompanying drawing, showing only a preferred embodiment of the invention.

BRIEF DESCRIPTION OF THE DRAWING

FIG. 1 is a vector diagram illustrating amplitude and phase relationships of the reflected energy.

FIG. 3 shows one form of a zero baseline establishing circuit 28 in greater detail.

FIG. 4 illustrates, with an assumed surface velocity, a series of waveforms at different stages of the receiver circuit.

DESCRIPTION OF A PREFERRED EMBODIMENT

Figure 2:
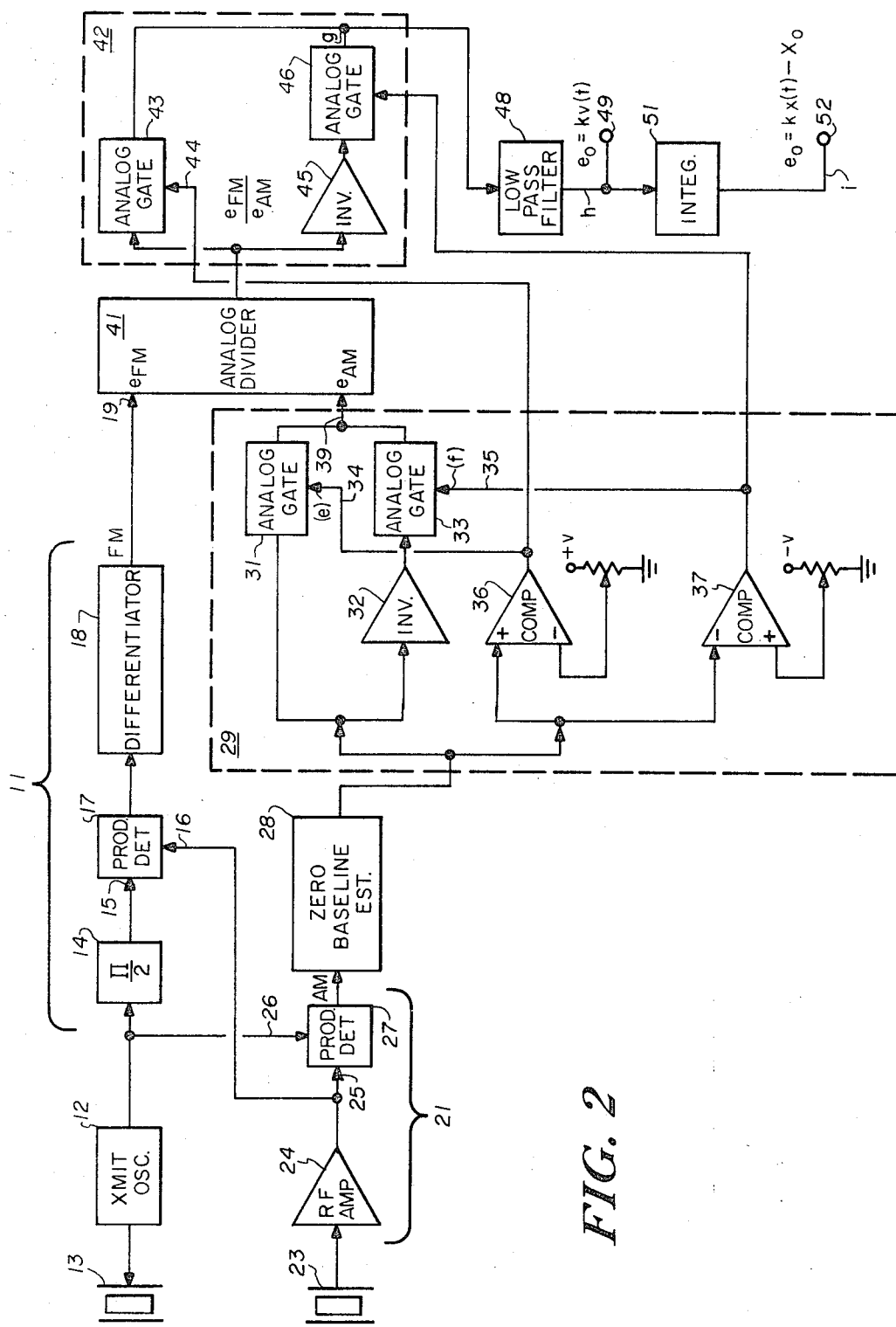
FIG. 2 is a schematic diagram of a receiver circuit for use with continuous wave Doppler ultrasound.

The circuit to be described in the ensuing description illustrates a manner of solving the calculative determination of velocity $v(t)$ and relative displacement $x(t)$ parameters of a surface to be monitored using Doppler-shifted reflected energy. In this particular case the transmitter and receiver are located close to one another.

In connection with the above, reference is made to FIG. 1 showing a vector diagram that will be helpful in discussing the reflecting surface velocity-versus-time in term of the FM and AM information contained in the complex waveform $e_R(t)$ obtained from an ultrasonic transducer operating in the continuous wave mode. Component vector $e_A$ represents the wave reflected directly from the moving surface of interest where angle $\phi(t)$ is related to the reflecting surface displacement. Vector $e_L$ represents the sum of all unmodulated waves received by the transducer.

In brief the equation $$v(t) = d\,x(t)/dt = \lambda/4\pi \; d\,\phi(t)/dt \qquad (1)$$

represents reflecting surface velocity where $\lambda$ denotes the wavelength of sound in the medium or velocity of sound divided by the carrier frequency. In the normal case where the amplitude of vector $e_A$ is considerably smaller than the amplitude of vector $e_L$, the phase angle $\phi(t)$ cannot be measured directly. Accordingly, the reflecting surface velocity, which is related to the phase angle $\phi(t)$ by equation (I) above, could not be measured directly, and it was desired to reconstruct reflecting surface velocity from the measurable quantities of angle modulation $\theta(t)$ and the complex wave amplitude $e_R(t)$. From Equation I and FIG. 1, if $|e_A| \ll |e_L|$, then $$v(t) = \frac{\lambda}{4\pi}\frac{d\phi(t)}{dt} = \frac{\lambda}{4\pi} e_L \frac{\frac{d\theta(t)}{dt}}{e_A \cos\phi}(t) \qquad (II)$$

Noting that $d\theta(t)/dt$ is the FM information and $e_A \cos\phi(t)$ is the AM information contained in $e_R(t)$, we may write $$v(t) = (\lambda/4\pi)e_L e_{FM}(t)/e_{AM}(t) \qquad (III)$$

Through mathematical computations, it was found that where $e_A \ll e_L$ the quantity $$\frac{d}{dt}\,[e_{AM}(t)\text{ phase shifted by }90°]$$

is equivalent to the FM information or the angle modulation $d\theta/dt$ and $e_L$ no longer appears in the below equation because $e_A \cos\phi(t)$ or $e_{AM}(t)$ does not depend on $e_L$ as $e_A/e_L \ll 1$. We then have, $$v(t) = \frac{\lambda}{4\pi}\frac{\frac{d}{dt}[e_A \sin\phi(t)]}{e_A \cos\phi(t)}$$

$$= \frac{\lambda}{4\pi}\frac{\frac{d}{dt}[e_{AM}(t)\text{ phase shifted by }90°]}{e_{AM}(t)} \qquad (IV)$$

Thus, by performing a division of the FM waveform by the AM waveform, one may obtain an exact quadrant by quadrant reconstruction of the changing phase of the wave modulated by the reflecting surface. This reconstruction is quite desirable for analyzing surface motion where transient changes take place in the space of less than one wavelength. Multiplication by a constant then gives the velocity-versus-time function of the surface whereby the output is calibrated in terms of absolute velocity and retains directional information. Relative displacement-versus-time may be obtained by integration of the velocity function. It is interesting to note that amplitude changes in the received energy do not affect the output velocity calibration due to the division operation.

An embodiment based on the above approach for the measurement of moving surfaces is described hereinafter. The following embodiment is especially suitable for monitoring surfaces of living organisms such as the measurement of: blood flow from ultrasonic energy reflected from moving blood cells; heart wall velocity and displacement; fetal movement; arterial wall movement during the opening and closing events of an artery under occlusion by externally applied pressure; etc.

With reference to FIG. 2, an oscillator 12 is connected to a transmitter crystal 13 and to an FM-channel 11 including a $\pi/2$ phase shift unit 14 coupled to input 15 of an AM product detector unit 17. A second input 16 to detector unit 17 is supplied from an AM-channel 21 to be described hereinafter. The output of detector 17 is connected to a differentiating unit 18 which output is tied as an FM-input signal to one input terminal 19 of an analog divider stage 41. With reference back to the AM-channel 21 there is included a receiver crystal 23 connected to an RF-amplifier 24. The output of RF-amplifier 24 is coupled through one path with input 25 of an AM product detector stage 27 and through a second path to input 16 of detector unit 17 as heretofore mentioned. A second input 26 to detector 27 is shown to be connected from the output of oscillator unit 12. The detector 27 output is connected to a baseline establishing unit 28.

In FIG. 3, there is shown a circuit diagram of the zero baseline establishing unit 28 which includes a coupling impedance 61 connected to input 62 of a differential amplifier 64 which second input 63 is grounded. A first feedback path 66 from the differential amplifier output lead 65 includes a series connected capacitor 67 and resistor 68 and a second parallel connected feedback path cathode 70 connects output lead 65 to each, the anode of diode 69 and the diode 71. The second terminal of each diode is mutually blocked against ground by capacitors 72 and 73 and connected to input 62 by resistors 74 and 75 respectively. The feedback circuitry via path 70 forms the difference between the integrated positive and negative peaks of the AM waveform and thereby establishes the median line with reference to the peak to peak excursions of the AM waveform.

With reference back to FIG. 2, output lead 65 of baseline establishing unit 28 is connected to a zero crossing inhibit unit 29 by two pairs of parallel paths. A first pair consists of an analog gate 31 in the first path and a series connected inverter 32 and analog gate 33 in the second path whereby the outputs of analog gates 31, 33 are coupled to the AM-input of a second input terminal 39 of analog divider stage 41. The second pair of paths connected from the zero baseline establish unit 28 includes at one path a positive comparator 36 and at the second path a negative comparator 37. Comparators 36 and 37 each include an adjustable potentiometer coupled between ground and a positive and negative voltage respectively. The output reference potential of comparator 36 is connected to the control input 34 of gate 31 whereas the output reference potential of comparator 37 is similarly connected to control input 35 of gate 33. Both outputs are also respectively connected to analog gates 43 and 46 at the output side of analog divider stage 41.

Divider 41 has a single output terminal which is connected through two parallel paths to a low pass filter 48. The first of these two paths includes an analog gate 43 the control input 44 of which is connected from comparator 36 of inhibit unit 29. The second path from the analog divider output includes a series connected inverter 45 and analog gate 46, the control input 47 of analog gate 46 being connected from comparator 37 of inhibit unit 29. The outputs of analog gates 43 and 46 are connected together and thence through low pass filter 48 to an output terminal 49, of the device, denoted as a velocity output. Output terminal 49 is coupled to an integrator 51 which provides an output terminal 52, denoted as a displacement output.

It should be understood, of course, that in lieu of utilizing an analog divider for performing the division of the FM waveform by the AM waveform, one might use other available techniques for division. For example, an A/D converter provided in the AM line and the FM line may be employed and then digital division would be performed. The digital division output would then be supplied to a D/A converter to provide a useful output signal in analog form representative of the surface velocity.

OPERATION

In reviewing the operation of the above embodiment, assume the surface of interest has a displacement characteristic waveform such as that shown in FIG. 4a, and a velocity characteristic waveform as illustrated in FIG. 4b. Transmitter oscillator 12 generates an RF signal which is used to activate crystal 13 to transmit an ultrasonic energy, having a certain frequency, to the surface which is to be observed. At the same time the RF signal is applied to detector 26, and to detector 17 by way of a phase shift of $\pi/2$ in unit 14. It is noted here that an alternate approach to accomplish the $\pi/2$ phase shift, would be to substitute a $+\pi/4$ phase shift unit for the $\pi/2$ phase shift unit 14, and, in addition, insert a $-\pi/4$ phase shift unit in line 26 leading into detector 27.

Receiver crystal 23 then picks up the reflected ultrasonic energy having a complex waveform the frequency of which, in the case of a moving reflecting surface, is shifted relative to the transmitted carrier frequency. After amplification by RF unit 24 the signal is applied to detectors 17 and 27 whereby in each detector the received signal is synchronously demodulated with the transmitter signal. Detector 27 generates a waveform, as illustrated in FIG. 4d, representative of the AM information in the reflected complex waveform, similar to the output of detector 17 except that the latter output is shifted in phase by ninety degrees. The phase shifted demodulated signal is then differentiated in unit 18 to provide an input signal at analog divider terminal 19 representative of the FM information, as depicted in FIG. 4c, of the complex waveform.

Should the AM information output of detector 27 normally contain a large number of Doppler cycles for all events of interest, the zero reference could readily be established by conventional AC coupling such as by a capacitor. However, for motions of the type made reference to above where only a given limited number of cycles are generated, conventional AC coupling would not provide an accurate zero reference. Thus, the present embodiment, which is designed for monitoring internal surfaces in a body, includes the zero baseline establishing unit 28 which provides a zero reference for a few cycles of AM information by detecting the positive and negative peaks of the AM waveform and establishing a zero baseline midway between these peak voltages.

As previously indicated, it was found desirable to have an output proportional to surface motion thus providing a system sensitive to transient changes in velocity. However, with a point by point division of the FM by the AM information in analog divider 41, at the zero crossing points of the AM waveform the quotient resulting from the division would be discontinuous or infinite. By passing the AM waveform through zero crossing inhibit unit 29, division by zero is avoided as this unit functions to inhibit calculation for a preset band around zero. This is accomplished by appropriate setting of the potentiometers at the inputs of the comparator units. Comparator 36 opens gate 31 when the AM waveform input lies above the inhibit preset band potential. In a similar fashion comparator 37 opens gate 33 when the AM waveform input lies below the inhibit preset band potential. Thus, the polarity of the waveform is detected by comparators 36 and 37 and, accordingly, the positive portions of the waveform are fed through gate 31 as illustrated in FIG. 4e, whereas the negative portions of the waveform are fed through inverter 32 and gate 33. Inverter 32 changes all negative going portions of the AM waveform into a positive going waveform as depicted in FIG.

4f, in order to meet the requirement of conventional divider units, which do not accept negative denominator inputs.

The output of analog divider 41 is fed to a restoring unit 42 which, by virtue of inverter 45 and control of gate 46 by comparator output 47, restores the negative going characteristic of the negative AM information, after the division in divider 41. In a similar fashion control of gate 43 by comparator output 44 restores the positive AM information, after division in divider 41, which results in a typical output such as the waveform shown in FIG. 4g. The low pass filter 48 smooths out the short interruptions of the output waveform in FIG. 4g, caused by the zero crossing inhibit unit 29 to provide at output 49 a waveform as shown in FIG. 4h.

It may be seen that output 49 provides a velocity-versus-time voltage function and retains directional information of the surface being measured. As illustrated, constant velocity of a specific duration is represented by a DC voltage function with a constant amplitude height lasting for a period equal to the duration of the velocity. The direction of the velocity is indicated by the polarity of the respective voltage function.

Integrator 51 allows for integrating the output signal $v(t)$ at terminal 49 to provide at output 52 a voltage-versus-time function $x(t)$ which is an accurate representative of the relative displacement-versus-time relation of the surface to be observed.

It should be understood, of course, that the foregoing disclosure relates to only one preferred embodiment of the invention. For example, it should be readily evident that the present invention can be utilized with forms of energy other than ultrasound and for measurement of moving surfaces other than those in living organisms. Also numerous modifications of the circuit are possible without departure from the principle of the invention. For instance one modification can be made by replacement of the two crystals 13 and 23 by one crystal for both functions. Also expressions may be derived for $x(t)$ and $v(t)$ in terms of only $e_{FM}(t)$, where derivation of the AM information by discriminators could be obtained by phase shifting the carrier reference by $\pi/2$ and integrating one channel of the resulting FM information to provide the AM information.

It should also be understood, of course, that there is a certain minimum velocity threshold which is measurable by this technique. This is determined by system sensitivity. Below the minimum velocity threshold, there is no output, therefore, initial displacement is always read out as zero irrespective of absolute initial displacement.

We claim:

1. A method for processing a Doppler signal resulting from a frequency shift of a carrier signal by reflection from a moving surface comprising,
   generating and transmitting the carrier signal,
   detecting the FM information and the AM information contained in said Doppler signal, and
   performing a division of the detected FM information by the detected AM information to provide an output signal representative of the surface velocity.

2. A method according to claim 1 including,
   integrating the output of said division step to provide an output signal representative of the relative surface displacement.

3. A method according to claim 1 wherein
   said detecting the AM information includes synchronously demodulating said Doppler signal with said carrier signal, and
   said detecting the FM information includes synchronously demodulating said Doppler signal with the carrier signal phase shifted to provide an AM signal, and then differentiating said AM signal.

4. A method according to claim 1 wherein
   said detecting the AM information includes synchronously demodulating said Doppler signal with said carrier signal at a first phase shift value and
   said detecting the FM information includes synchronously demodulating said Doppler signal with the carrier signal at a second phase shift value, and then differentiating said AM signal, whereby the difference between said first and second phase shift values amounts to $\pi/2$.

5. An apparatus for processing a Doppler signal resulting from a frequency shift of a carrier signal by reflection from a moving surface, comprising
   means for generating and transmitting the carrier signal,
   means for detecting the FM and AM information contained in said Doppler signal,
   means coupled with said detecting means for performing a division of said FM information by said AM information to provide an output signal representative of velocity of said surface.

6. Apparatus according to claim 5 including
   means for integrating said output velocity signal to provide an output signal representative of relative displacement of said surface.

7. An apparatus according to claim 5 wherein said detecting means includes
   means for receiving said Doppler signal,
   first demodulating means coupled with said receiving means and said generating means for synchronously demodulating said Doppler signal to provide an AM information output,
   phase shift means connected from said generating means,
   second demodulating means coupled with said receiving means and said phase shift means for synchronously demodulating said Doppler signal, and
   differentiating means connected from said second demodulating means to provide an FM information output.

8. An apparatus according to claim 7 wherein said detecting means further includes,
   inhibiting means coupled from said first demodulating means for excluding zero crossing data from said AM information output to avoid division by zero.

9. An apparatus according to claim 8 including
   zero baseline establishing means connected from said first demodulating means and to said inhibiting means.

10. An apparatus according to claim 8 wherein said inhibiting means includes
    analog gate means connected between said first demodulating means and said division means, and
    comparator means connected from said first demodulating means and to said analog gate means to change original polarity indications of said AM information output for uniformity in application to said division means.

11. An apparatus according to claim 10 including
    restoring means connected from the output of said division means and said comparator means for restoring the original polarity indications.

12. An apparatus according to claim 11 including
    filter means coupled with said restoring means for smoothing out the interruptions caused by said inhibiting means.

13. An apparatus according to claim 12 including
    integrating means coupled from said filter means to provide an output signal representative of relative displacement of the surface.

14. An apparatus according to claim 5 wherein
    said transmitting means includes means for generating said carrier signal in the form of ultrasonic energy.

15. An apparatus according to claim 5 where said division means includes an analog divider.

16. An apparatus according to claim 10 where said division means includes an analog divider.

* * * * *